（12）United States Patent
Chen

(10) Patent No.: US 10,506,292 B2
(45) Date of Patent: Dec. 10, 2019

(54) VIDEO PLAYER CALLING METHOD, APPARATUS, AND STORAGE MEDIUM

(71) Applicant: TENCENT TECHNOLOGY (SHENZHEN) COMPANY LIMITED, Shenzhen (CN)

(72) Inventor: Chaoming Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 143 days.

(21) Appl. No.: 15/701,608

(22) Filed: Sep. 12, 2017

(65) Prior Publication Data

US 2018/0007440 A1    Jan. 4, 2018

Related U.S. Application Data

(63) Continuation of application No. PCT/CN2016/093595, filed on Aug. 5, 2016.

(30) Foreign Application Priority Data

Aug. 20, 2015    (CN) .......................... 2015 1 0515471

(51) Int. Cl.
*G06F 15/173* (2006.01)
*H04N 21/4782* (2011.01)
(Continued)

(52) U.S. Cl.
CPC ..... *H04N 21/4782* (2013.01); *G06F 16/9577* (2019.01); *G06F 16/972* (2019.01); *G06F 2216/15* (2013.01)

(58) Field of Classification Search
CPC ............ H04N 21/4782; G06F 16/9577; G06F 16/972
See application file for complete search history.

(56) References Cited

U.S. PATENT DOCUMENTS 9,766,769 B1 *   9/2017  Webber ................. G06F 3/0481
2002/0161797 A1 * 10/2002  Gallo ................... G06F 16/9577
                                                              715/203
(Continued)

FOREIGN PATENT DOCUMENTS

CN        102647634 A      8/2012
CN        102681891 A      9/2012
(Continued)

OTHER PUBLICATIONS

David Walsh, MutationObserver API, Apr. 15, 2015, https://davidwalsh.name/mutationobserver-api (Year: 2015).*
(Continued)

*Primary Examiner* — Phyllis A Book
(74) *Attorney, Agent, or Firm* — Anova Law Group, PLLC

(57) ABSTRACT

The present disclosure provides a video player calling method, apparatus, and storage medium. The method includes: creating a mutation observer process; registering a playing callback event in the mutation observer process, wherein the mutation observer process is configured for monitoring a page node tree in a page loading event according to an observation option configured in the playing callback event; the page node tree comprises a video label; the page loading event comprises an event of loading a video in a web page; and the playing callback event is configured for modifying a function of calling a video player in the web page; monitoring the page node tree by running the mutation observer process; performing the playing callback event when the video label exists in the page node tree; and playing the video in the web page by using the video player identified in the playing callback event.

15 Claims, 3 Drawing Sheets

(51) Int. Cl.
*G06F 16/958* (2019.01)
*G06F 16/957* (2019.01)

(56) References Cited

U.S. PATENT DOCUMENTS

2007/0112714 A1* 5/2007 Fairweather ............ G06F 8/427
                                                          706/46
2016/0314301 A1* 10/2016 Johns ..................... G06F 21/577
2018/0300162 A1* 10/2018 Kotlicki .................. G06F 9/453

FOREIGN PATENT DOCUMENTS

| CN | 103699483 A |   | 4/2014  |
|----|-------------|---|---------|
| CN | 104156488 A | * | 11/2014 |
| CN | 104166545 A |   | 11/2014 |

OTHER PUBLICATIONS

The World Intellectual Property Organization (WIPO) International Search Report for PCT/CN2016/093595 dated Oct. 21, 2016 6 Pages (including translation).

* cited by examiner

US 10,506,292 B2

VIDEO PLAYER CALLING METHOD, APPARATUS, AND STORAGE MEDIUM

CROSS REFERENCE TO RELATED APPLICATIONS

This application is a continuation application of PCT Patent Application No. PCT/CN2016/093595, filed on Aug. 5, 2016, which claims priority to Chinese Patent Application No. 201510515471.0, entitled "VIDEO PLAYER CALLING METHOD, APPARATUS, AND STORAGE MEDIUM", filed on Aug. 20, 2015, which is incorporated by reference in its entirety.

FIELD OF THE TECHNOLOGY

The present disclosure relates to the field of terminal application, and in particular, to a video player calling method and apparatus, and a storage medium.

BACKGROUND OF THE DISCLOSURE

During daily application, a browser usually has an original built-in video player. When detecting a video playing requirement, the browser calls the built-in video player by default to play a video. However, because users have different interests, or have different requirements on functions of video players, the browser needs to call a non-built-in video player to play a video.

In the existing technology, when page loading of a browser is finished, Javascript (JS) code is injected, and a timer is enabled in the JS, to search for and modify a video label in a page. When the video label is found, a video playing process in the page is modified, to call a non-built-in video player.

In a Hypertext Markup Language (HTML) 5 web page, there are various page loading cases, for example, a non-refresh web page loading event, that is, a user clicks a new video in a player. In this case, not all of entire content in the web page is refreshed, and only a small quantity of elements such as a video label are updated, causing that an event of injecting JS cannot be triggered. Consequently, a non-built-in video player cannot be called to play a video.

SUMMARY

Embodiments of the present disclosure provide a video player calling method and apparatus, and a storage medium, and are directed to call a video player that is not built in a browser.

The video player calling method provided in an embodiment of the present disclosure includes: creating a mutation observer process; registering a playing callback event in the mutation observer process, wherein the mutation observer process is configured for monitoring a page node tree in a page loading event according to an observation option configured in the playing callback event; the page node tree comprises a video label; the page loading event comprises an event of loading a video in a web page; and the playing callback event is configured for modifying a function of calling a video player in the web page; monitoring the page node tree by running the mutation observer process in the page loading event; performing the playing callback event when the video label exists in the page node tree; and playing the video in the web page by using the video player identified in the playing callback event.

The video player calling apparatus provided in an embodiment of the present disclosure includes: a memory, and a processor coupled to the memory, the processor being configured to: create a mutation observer process; register a playing callback event in the mutation observer process, wherein the mutation observer process is configured for monitoring a page node tree in a page loading event according to an observation option configured in the playing callback event; the page node tree comprises a video label; the page loading event comprises an event of loading a video in a web page; and the playing callback event is configured for modifying a function of calling a video player in the web page; monitor the page node tree by running the mutation observer process in the page loading event; perform the playing callback event when the video label exists in the page node tree; and play the video in the web page by using the video player identified in the playing callback event.

A non-volatile computer readable storage medium provided in an embodiment of the present disclosure includes program instructions for, when run by a processor of a computing device, implementing a video player calling method, the method including: creating a mutation observer process; registering a playing callback event in the mutation observer process, wherein the mutation observer process is configured for monitoring a page node tree in a page loading event according to an observation option configured in the playing callback event; the page node tree comprises a video label; the page loading event comprises an event of loading a video in a web page; and the playing callback event is configured for modifying a function of calling a video player in the web page; monitoring the page node tree by running the mutation observer process in the page loading event; performing the playing callback event when the video label exists in the page node tree; and playing the video in the web page by using the video player identified in the playing callback event.

BRIEF DESCRIPTION OF THE DRAWINGS

To describe the technical solutions in the embodiments of the present disclosure or the existing technology more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are only some of the embodiments of the present disclosure rather than all of the embodiments. All other embodiments obtained by a person of ordinary skill in the art based on the embodiments of the present disclosure without creative efforts shall fall within the protection scope of the present disclosure.

The following makes detailed descriptions separately.

In the specification, claims, and the foregoing accompanying drawings of the present disclosure, the terms "first", "second", "third", "fourth", and the like (if there is one) are intended to distinguish between similar objects, and are not necessarily intended to describe a particular order or sequence. It should be understood that data used in this manner may be exchanged in a proper case. In addition, the terms "include", "having", and any variants thereof are intended to cover a non-exclusive inclusion. For example, in the context of a process, method, system, product, or device that includes a series of steps or units, the process, method, system, product, or device not only includes such steps or units that are specified expressly, but also includes other steps or units that are not specified expressly or that are inherent in the process, method, product, or device.

An embodiment of a video player calling method in embodiments of the present disclosure includes: creating a mutation observer process, and registering a playing callback event in the mutation observer process, the mutation observer process being configured for monitoring a page node tree in a page loading event according to an observation option configured in the playing callback event; the page node tree including a video label; the page loading event being an event of loading a video in a web page; and the playing callback event being configured for modifying a function of calling a video player in the web page; running the mutation observer process in the page loading event, monitoring the page node tree, and performing the playing callback event when there is a video label in the page node tree; and playing a video in the web page by using a video player indicated in the playing callback event. The method can be implemented by a computing terminal containing a processor and a memory. A browser application is installed on the computing terminal for loading the web page and play the video in the web page.

Figure 1:
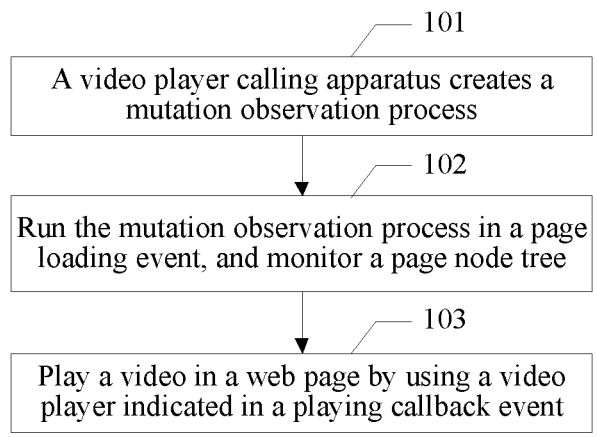
FIG. 1 is a schematic flowchart of a video player calling method according to an embodiment of the present disclosure.

The following describes the video player calling method in the embodiments of the present disclosure by using detailed embodiments. Referring to FIG. 1, an embodiment of the video player calling method in the embodiments of the present disclosure includes step 101 to step 103.

101: A video player calling apparatus creates a mutation observer process.

The video player calling apparatus creates a mutation observer process, and registers a playing callback event in the mutation observer process, the mutation observer process being configured for monitoring a page node tree in a page loading event according to an observation option configured in the playing callback event, the page node tree including a video label, the page loading event including an event of loading a video in a web page, and the playing callback event being configured for modifying a function of calling a video player in the web page.

Exemplarily, the mutation observer process may be a mutation observer (MO). The mutation observer provides developers with a capability of making a proper response when a page node tree within a range changes. The page node tree is a data tree that includes multiple layers/levels of data nodes in an HTML page. Exemplarily, the page node tree may be a document object model (DOM) tree. The DOM may access and modify content and a structure of a document in a platform and language independent manner. The DOM is a common method for representing and processing an HTML. After the page loading event, the mutation observer process may continue functioning as long as the web page is opened in the browser.

A page loading event includes a time of loading a web page in a browser, and/or a DOM content loaded event.

The registering a playing callback event in the mutation observer process may include the following steps.

First, a callback processing function is registered in the mutation observer process, and the callback processing function is a function of triggering the playing callback event.

Second, a configuration parameter of the observation option in the playing callback event is obtained. Exemplarily, after a developer inputs an observation option, the video player call apparatus may obtain a configuration parameter of the observation option. Optionally, the configuration parameter of the observation option may include: a monitored element attribute, a monitored child node list, and a child node level of a monitored object. The monitored element attribute may be an element attribute, for example, a function represented by a node such as playing, pause, and progress adjustment. The monitored child node list may be a childlist. Further, the configuration parameter of the observation option may further include parameters such as character data and a subtree.

Third, a condition of triggering the callback processing function is set according to the configuration parameter of the observation option.

In this embodiment of the present disclosure, the video player calling apparatus may be a single physical device, and includes multiple physical modules; or may be a software program loaded in a computer or a mobile terminal; or may be a functional module in software; or may exist in the form of single software or in the form of a plug-in. The description of the video player calling apparatus is merely exemplary. Division on the units is merely division according to logical functions. During actual implementation, another division manner may be used. For example, multiple units or components may be combined or integrated into another system, or some features may be ignored or not performed. In addition, the displayed or discussed mutual couplings or direct couplings or communication connections may be implemented by means of some interfaces, indirect couplings or communication connections between apparatuses or units, or electrical connections, mechanical connections, or connections in other forms. When the integrated unit is implemented in the form of a software functional unit and sold or used as an independent product, the integrated unit may be stored in a computer-readable storage medium.

102: Run the mutation observer process in the page loading event, and monitor the page node tree.

The video player calling apparatus runs the mutation observer process in the page loading event, monitors the page node tree, and performs the playing callback event when there is a video label in the page node tree.

Exemplarily, during actual application, when initialization of the page node tree is completed, the video player calling apparatus determines whether there is a video label in the page node tree.

If there is a video label, it is determined that there is a video playing event. The video player calling apparatus triggers the playing callback event, performs a function of the playing callback event, and modifies a playing function of the video label.

If there is no video label, the video player calling apparatus continues to monitor the initialized page node tree. If the page node tree changes, the video player calling apparatus determines again whether there is a video label in the page node tree.

During a process in which the mutation observer process monitors the page loading event, if it is found that the page node tree established by the page loading event includes a video label, a position of a child node corresponding to the video label in the page node tree is determined. In the child node corresponding to the video label, a first function is replaced with a second function. The first function is an original video playing function in the web page. The second function is a function corresponding to a video player indicated in the playing callback event. Exemplarily, code for replacement may be: video.play=function( ){ . . . }.

103: Play a video in the web page by using the video player identified in the playing callback event.

In the child node corresponding to the video label, after the first function is replaced with the second function, the second function may implement a function thereof, for example, playing a video in the page by using the video player indicated in the playing callback event.

In this embodiment of the present disclosure, a mutation observer process is created in a browser, and a playing callback event is registered in the mutation observer process, to monitor a page node tree loaded in the browser; when there is a video label in the page node tree, the playing callback event is performed to modify a function of calling a video player in a web page, so that the browser plays a video in the web page by using a video player indicated in the playing callback event. In the solutions of the present disclosure, a current page update notification may be easily obtained, thereby effectively improving a success rate of calling a non-built-in player.

In this embodiment of the present disclosure, even if a non-refresh web page loading event occurs, the video player calling apparatus may detect a change of the page node tree by means of the mutation observer process, so that when clicking a new video in a player in the web page, a user can use a player that is not built in the browser to play the video. In other words, the video player for playing the video in the web page is not a built-in player of the browser. In existing technologies, if a video player is not a built-in player of the browser, the video playing works only when the whole page is just refreshed or loaded. However, when a user action intended to change current video play (e.g., clicking an icon associated with a new video shown in the video player, sliding a playing progress bar for a currently playing video) is received, such user action may be non-responsive because updates of individual or small number of elements do not trigger JS injection and the browser is not informed. By using the disclosed method, such technical issue can be addressed. Specifically, dynamic changes to the video playing is constantly monitored by the mutation observer process such that updated user action on the video player can be correctly handled.

Figure 2:
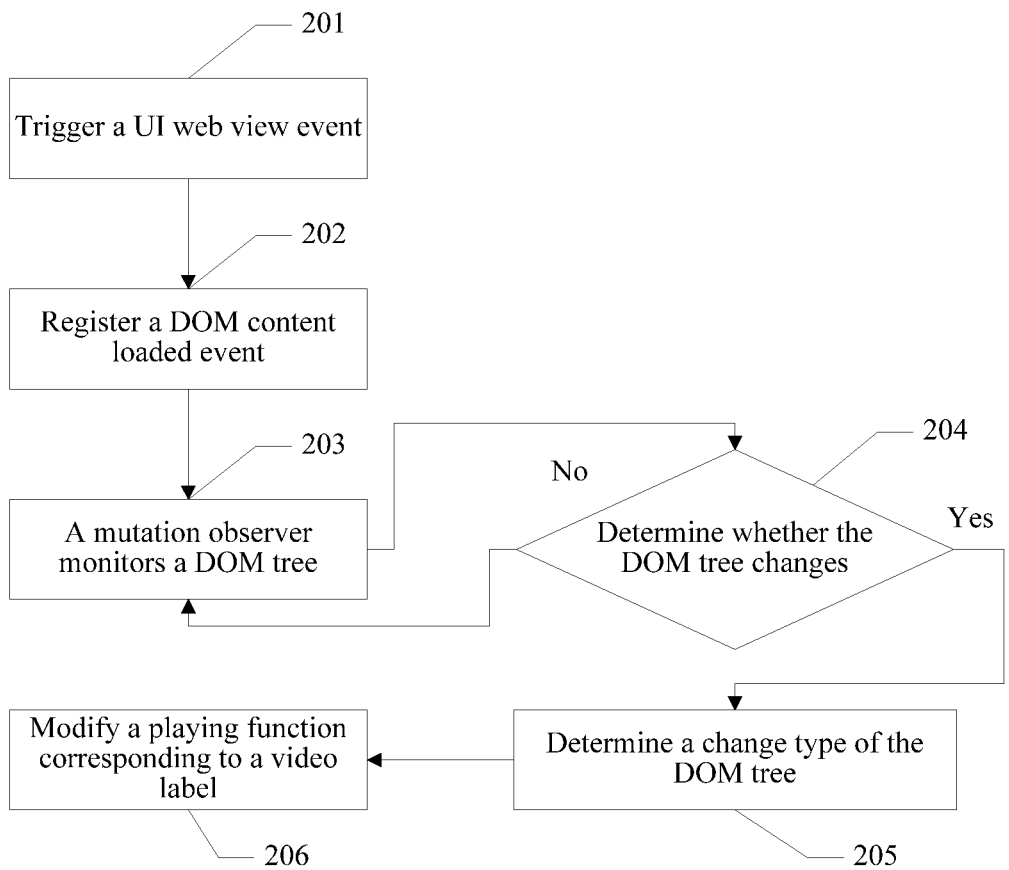
FIG. 2 is another schematic flowchart of a video player calling method according to an embodiment of the present disclosure.

For understanding convenience, the following describes the video player calling method in the embodiments of the present disclosure by using an application example. Referring to FIG. 2, an embodiment of the video player calling method in the embodiments of the present disclosure includes step 201 to step 206. The method can be implemented by a computing terminal containing a processor and a memory.

201: Trigger a UI web view event.

The UI web view event is a web page loading event. When a UI web view event occurs in a current page, step 202 is triggered.

202: Register a DOM content loaded event.

When a web page loading event occurs, the video player calling apparatus registers a DOM content loaded event.

203: A mutation observer monitors a DOM tree.

The video player calling apparatus creates a mutation observer, registers a playing callback event in the mutation observer, and enables the mutation observer in the DOM content loaded event, to monitor the DOM tree.

204: Determine whether the DOM tree changes.

The video player calling apparatus determines whether the DOM tree changes. If the DOM tree changes, step 205 is performed; or if the DOM tree does not change, step 203 is performed.

205: Determine a change type of the DOM tree.

If it is determined that the change type of the DOM tree is video label addition or a video label change, step 206 is performed; or if it is determined that the change type of the DOM tree is neither of video label addition and a video label change, step 203 is performed.

206: Modify a playing function corresponding to the video label.

During a process in which the mutation observer monitors the DOM content loaded event, if it is found that a page node tree established by the DOM content loaded event includes a video label, a position of a child node corresponding to the video label in the page node tree is determined. In the child node corresponding to the video label, a first function is replaced with a second function. The first function is an original video playing function in the web page. The second function is a function corresponding to a video player indicated in the playing callback event. Exemplarily, code for replacement may be: video.play=function( ){ . . . }.

Finally, a video in the web page is played by using the video player indicated in the playing callback event.

In some embodiments, the methods shown in FIGS. 1-2 may be implemented in a browser application. For example, when a web page is opened, the browser application can trigger the UI Web View event, and activate the mutation observer process.

Figure 3:
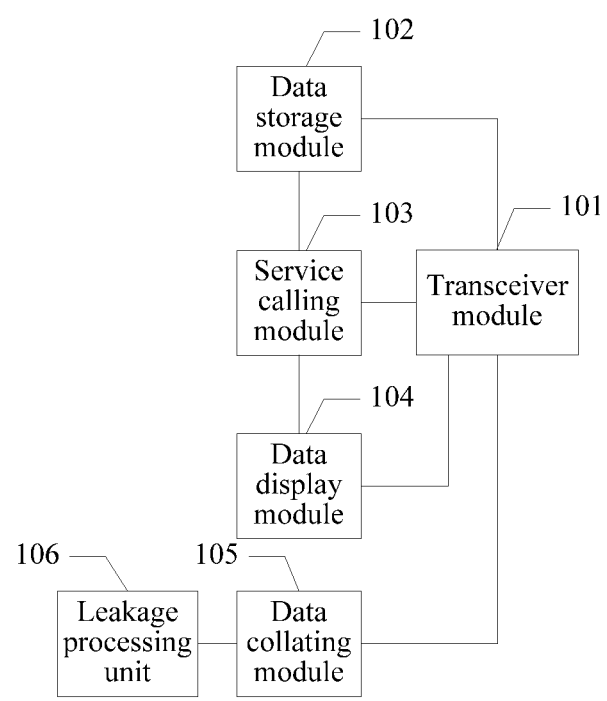
FIG. 3 is a schematic structural diagram of a video player calling apparatus according to an embodiment of the present disclosure.

The following describes the video player calling apparatus for performing the video player calling method in the embodiments of the present disclosure. Referring to FIG. 3, an embodiment of the video player calling apparatus in the embodiments of the present disclosure includes: a memory storing program units, a processor coupled to the memory and configured to execute the program units. The program units include: a creation unit 301, configured to create a mutation observer process, and register a playing callback event in the mutation observer process, the mutation observer process being configured for monitoring a page node tree in a page loading event according to an observation option configured in the playing callback event; the page node tree including a video label; the page loading event including an event of loading a video in a web page; and the playing callback event being configured for modifying a function of calling a video player in the web page; a monitoring unit 302, configured to run the mutation observer process in the page loading event, monitor the page node tree, and perform the playing callback event when there is a video label in the page node tree; and a playing unit 303, configured to play a video in the web page by using a video player indicated in the playing callback event.

The creation unit 301 is specifically configured to: register a callback processing function in the mutation observer process, the callback processing function being a function of triggering the playing callback event; obtain a configuration parameter of the observation option in the playing callback event; and set, according to the configuration parameter of the observation option, a condition of triggering the callback processing function.

The configuration parameter of the observation option includes: a monitored element attribute, a monitored child node list, and a child node level of a monitored object.

Further, the monitoring unit 302 is specifically configured to: determine whether there is a video label in the page node tree when initialization of the page node tree is completed; and perform the playing callback event if there is a video label in the page node tree; or continue to monitor the initialized page node tree if there is no video label in the page node tree; and if the page node tree changes, determine again whether there is a video label in the page node tree.

Further, the monitoring unit 302 is specifically configured to: determine a child node corresponding to the video label in the page node tree; and replace a first function with a second function in the child node corresponding to the video label, the first function being an original video playing function in the web page, and the second function being a video playing function indicated in the playing callback event.

For operation processes of the units in this embodiment of the present disclosure, refer to the foregoing method embodiments, and details are not described herein again.

In the several embodiments provided in the application, it should be understood that the disclosed apparatus and method may be implemented in other manners. For example, the foregoing described apparatus embodiment is merely exemplary. For example, division on the units is merely division according to logical functions. During actual implementation, another division manner may be used. For example, multiple units or components may be combined or integrated into another system, or some features may be ignored or not performed. In addition, the displayed or discussed mutual couplings or direct couplings or communication connections may be implemented by means of some interfaces, indirect couplings or communication connections between apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments. In some embodiments, the program units may be integrated in a browser application. Accordingly, the browser application is enabled to perform the disclosed method.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Figure 4:
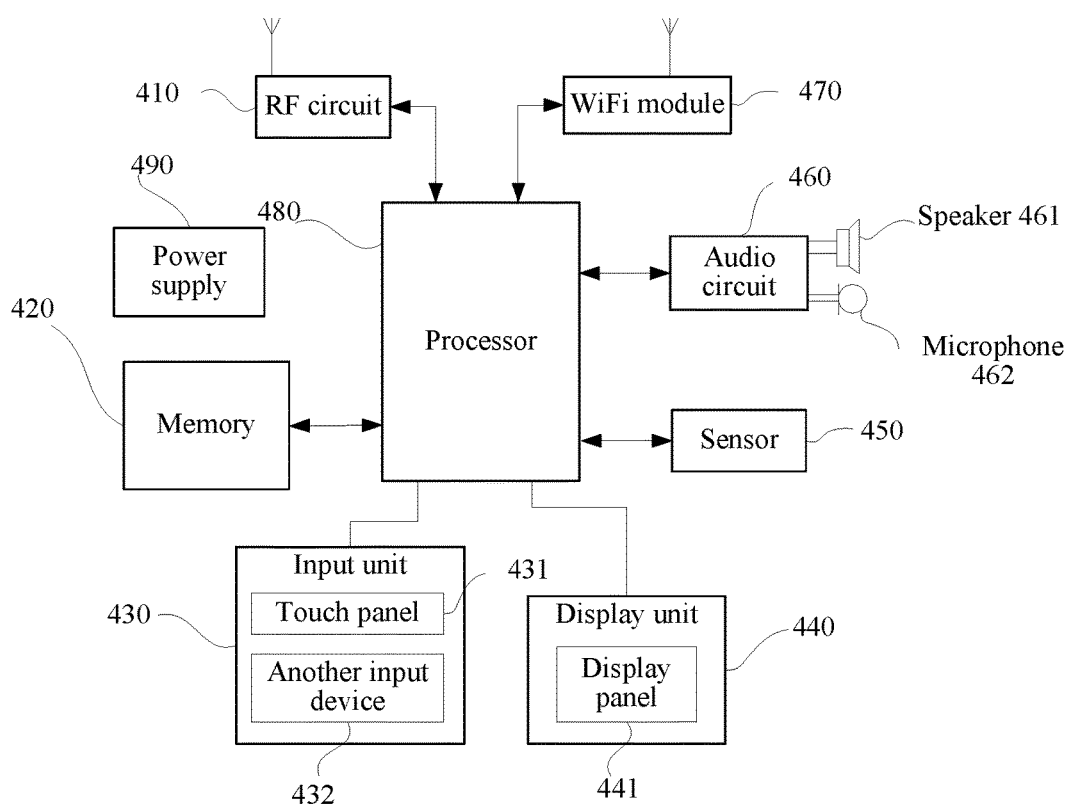
FIG. 4 is a schematic structural diagram of a video player calling apparatus according to an embodiment of the present disclosure.

An embodiment of the present disclosure further provides another video player calling apparatus, as shown in FIG. 4. For description convenience, only parts related to this embodiment of the present disclosure are shown, and specific technical details are not disclosed. For the technical details, refer to the method part of the embodiments of the present disclosure. The terminal may be any terminal device such as a mobile phone, a tablet computer, a personal digital assistant (PDA), a point of sales (POS), and an in-vehicle computer. That the terminal is a mobile phone is used as an exam for description.

FIG. 4 is a block diagram of a structure of a part of a mobile phone related to a video player calling terminal according to an embodiment of the present disclosure. Referring to FIG. 4, the mobile phone includes components such as a radio frequency (RF) circuit 410, a memory 420, an input unit 430, a display unit 440, a sensor 450, an audio circuit 460, a wireless fidelity (WiFi) module 470, a processor 480, and a power supply 490. A person skilled in the art should understand that the structure of the mobile phone shown in FIG. 4 does not constitute a limitation to the mobile phone, and the mobile phone may include more components or fewer components than those shown in the figure, or some components may be combined, or different component deployment may be used.

The following specifically describes the components of the mobile phone with reference to FIG. 4.

The RF circuit 410 may be configured to receive and send signals during an information receiving and sending process or a call process. Particularly, the RF circuit 410 receives downlink information from a base station, then delivers the downlink information to the processor 480 for processing, and sends related uplink data to the base station. Generally, the RF circuit 410 includes, but is not limited to, an antenna, at least one amplifier, a transceiver, a coupler, a low noise amplifier (LNA), a duplexer, and the like. In addition, the RF circuit 410 may also communicate with a network and another device by means of wireless communication. The wireless communication may use any communications standard or protocol, which includes, but is not limited to Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 420 may be configured to store a software program and a module, and the processor 480 runs the software program and the module that are stored in the memory 420, so as to perform various function applications and data processing. The memory 420 may mainly include a program storage area and a data storage area. The program storage area may store an operating system and an application program required by at least one function (such as a sound playback function and an image display function), and the like. The data storage area may store data (such as audio data and an address book) created according to use of the mobile phone, and the like. In addition, the memory 420 may include a high speed random access memory, and may also include a non-volatile memory such as at least one magnetic disk storage device, a flash memory, or another volatile solid-state storage component.

The input unit 430 may be configured to receive input digit or character information, and generate a keyboard signal input related to the user setting and function control of the mobile phone. Specifically, the input unit 430 may include a touch panel 431 and another input device 432. The touch panel 431, which may alternatively be referred to as a touchscreen, may collect a touch operation of a user on or near the touch panel (such as an operation of a user on or near the touch panel 431 by using any suitable object or accessory such as a finger or a stylus), and drive a corresponding connection apparatus according to a preset program. Optionally, the touch panel 431 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinate to the processor 480. Moreover, the touch controller can receive and execute a command sent from the processor 480. In addition, the touch panel 431 may be a resistive, capacitive, infrared, or surface sound wave type touch panel. In addition to the touch panel 431, the input unit 430 may further include the another input devices 432. Specifically, the another input device 432 may include, but is not limited to, one or more of a physical keyboard, a functional key (such as a volume control key or a switch key), a track ball, a mouse, and an operation bar.

The display apparatus 440 may be configured to display information input by the user or information provided for the user, and various menus of the mobile phone. The display unit 440 may include a display panel 441. Optionally, the display panel 441 may be configured by using a liquid crystal display (LCD), an organic light-emitting diode (OLED), or the like. Further, the touch panel 431 may cover the display panel 441. After detecting a touch operation on or near the touch panel 431, the touch panel 441 transfers the touch operation to the processor 480, so as to determine the type of the touch event. Then, the processor 480 provides a corresponding visual output on the display panel 441 according to the type of the touch event. Although, in FIG. 4, the touch panel 431 and the display panel 441 are used as two separate parts to implement input and output functions of the mobile phone, in some embodiments, the touch panel 431 and the display panel 441 may be integrated to implement the input and output functions of the mobile phone.

The mobile terminal may further include at least one sensor 450 such as an optical sensor, a motion sensor, and other sensors. Specifically, the optical sensor may include an ambient light sensor and a proximity sensor. The ambient light sensor may adjust luminance of the display panel 441 according to brightness of the ambient light. The proximity sensor may switch off the display panel 441 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be further configured in the mobile phone, are not further described herein.

The audio circuit 460, a speaker 461, and a microphone 462 may provide audio interfaces between the user and the mobile terminal. The audio circuit 460 may convert received audio data into an electric signal and transmit the electric signal to the speaker 461. The speaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 sends the audio data to, for example, another mobile phone by using the RF circuit 410, or outputs the audio data to the memory 420 for further processing.

WiFi is a short distance wireless transmission technology. The mobile phone may help, by using a WiFi module 470, the user to receive and send e-mails, browse a web page, access streaming media, and so on, which provides wireless broadband Internet access for the user. Although FIG. 4 shows the WiFi module 470, it may be understood that the WiFi module 407 is not a necessary composition of the mobile phone, and when required, the WiFi module can be omitted according to a requirement as long as the scope of the essence of the present disclosure is not changed.

The processor 480 is the control center of the mobile terminal, and is connected to various parts of the mobile phone by using various interfaces and wires. By running or executing the software program and/or module stored in the memory 420, and invoking data stored in the memory 420, the processor 480 performs various functions and data processing of the mobile phone, thereby performing overall monitoring on the mobile phone. Optionally, the processor 480 may include one or more processing units. Preferably, the processor 480 may integrate an application processor and a modem. The application processor mainly processes an operating system, a user interface, an application program, and the like. The modem mainly processes wireless communication. It may be understood that the foregoing modem may either not be integrated into the processor 480.

The mobile phone further includes the power supply 490 (for example, a battery) for supplying power to the components. Preferably, the power supply may be logically connected to the processor 480 by using a power management system, thereby implementing function such as charging, discharging, and power consumption management by using the power management system.

Although not shown in the figure, the mobile phone may further include a camera, a Bluetooth module, and the like, which are not further described herein.

Specifically, in this embodiment, the memory 420 stores one or more programs. The one or more programs are configured to be executed by one or more processors. The one or more programs contain instructions configured for performing the following operations: creating a mutation observer process, and registering a playing callback event in the mutation observer process, the mutation observer process being configured for monitoring a page node tree in a page loading event according to an observation option configured in the playing callback event, the page node tree including a video label, the page loading event including an event of loading a video in a web page, and the playing callback event being configured for modifying a function of calling a video player in the web page; running the mutation observer process in the page loading event, monitoring the page node tree, and performing the playing callback event when there is a video label in the page node tree; and playing a video in the web page by using a video player indicated in the playing callback event.

The one or more programs further contain instructions configured for performing other operations in the video player calling method in FIG. 1 and FIG. 2.

In the embodiments of the present disclosure, a mutation observer process is created in a browser, and a playing callback event is registered in the mutation observer process, to monitor a page node tree loaded in the browser; when there is a video label in the page node tree, the playing callback event is performed to modify a function of calling a video player in a web page, so that the browser plays a video in the web page by using a video player indicated in the playing callback event. In the solutions of the present disclosure, a current page update notification may be easily obtained, thereby effectively improving a success rate of calling a non-built-in player.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video player calling method implemented by a computing terminal having a processor and a memory, comprising:
    creating a mutation observer process, wherein the mutation observer process is configured for monitoring a page node tree in a page loading event according to an observation option configured in the playing callback event;
    registering a playing callback event in the mutation observer process, wherein the page node tree comprises a video label; the page loading event comprises an event of loading a video in a web page; and the playing callback event is configured for modifying a function of calling a video player in the web page;
    monitoring the page node tree by running the mutation observer process in the page loading event;
    performing the playing callback event when the video label exists in the page node tree, comprising:
        determining a child node corresponding to the video label in the page node tree; and
        replacing a first function with a second function in the child node corresponding to the video label, the first function being an original video playing function in the web page, and the second function being a function corresponding to the video player identified in the playing callback event; and
    playing the video in the web page by using the video player identified in the playing callback event.

2. The method according to claim 1, wherein the registering a playing callback event in the mutation observer process comprises:
    registering a callback processing function in the mutation observer process, the callback processing function being a function of triggering the playing callback event;
    obtaining a configuration parameter of the observation option in the playing callback event; and
    setting, according to the configuration parameter of the observation option, a condition of triggering the callback processing function.

3. The method according to claim 2, wherein the configuration parameter of the observation option comprises:
    a monitored element attribute, a monitored child node list, and a child node level of a monitored object.

4. The method according to claim 1, wherein the monitoring the page node tree, and performing the playing callback event when there is a video label in the page node tree comprises:
    determining whether the video label exists in the page node tree when initialization of the page node tree is completed; and
    performing the playing callback event if the video label exists in the page node tree; or
    continuing to monitor the initialized page node tree if no video label exists in the page node tree; and if the page node tree changes, determining again whether the video label exists in the page node tree.

5. The method according to claim 1, wherein the video player is not a built-in player of a browser loading the web page.

6. A video player calling apparatus, comprising:
    a memory, and
    a processor coupled to the memory, the processor being configured to:
    create a mutation observer process, wherein the mutation observer process is configured for monitoring a page node tree in a page loading event according to an observation option configured in the playing callback event;
    register a playing callback event in the mutation observer process, wherein the page node tree comprises a video label; the page loading event comprises an event of loading a video in a web page; and the playing callback event is configured for modifying a function of calling a video player in the web page;
    monitor the page node tree by running the mutation observer process in the page loading event;
    perform the playing callback event when the video label exists in the page node tree, comprising:
        determining a child node corresponding to the video label in the page node tree; and
        replacing a first function with a second function in the child node corresponding to the video label, the first function being an original video playing function in the web page, and the second function being a video playing function corresponding to the video player identified in the playing callback event; and
    play the video in the web page by using the video player identified in the playing callback event.

7. The apparatus according to claim 6, wherein the processor is further configured to:
    register a callback processing function in the mutation observer process, the callback processing function being a function of triggering the playing callback event;
    obtain a configuration parameter of the observation option in the playing callback event; and
    set, according to the configuration parameter of the observation option, a condition of triggering the callback processing function.

8. The apparatus according to claim 7, wherein the configuration parameter of the observation option comprises:

a monitored element attribute, a monitored child node list, and a child node level of a monitored object.

9. The apparatus according to claim 6, wherein the processor is further configured to:
determine whether the video label exists in the page node tree when initialization of the page node tree is completed; and
perform the playing callback event if the video label exists in the page node tree; or
continue to monitor the initialized page node tree if no video label exists in the page node tree; and if the page node tree changes, determine again whether the video label exists in the page node tree.

10. The apparatus according to claim 6, wherein the video player is not a built-in player of a browser loading the web page.

11. A non-volatile computer readable storage medium, comprising program instructions for, when run by a processor of a computing device, implementing a video player calling method, the method comprising:
creating a mutation observer process, wherein the mutation observer process is configured for monitoring a page node tree in a page loading event according to an observation option configured in the playing callback event;
registering a playing callback event in the mutation observer process, wherein the page node tree comprises a video label; the page loading event comprises an event of loading a video in a web page; and the playing callback event is configured for modifying a function of calling a video player in the web page;
monitoring the page node tree by running the mutation observer process in the page loading event;
performing the playing callback event when the video label exists in the page node tree, comprising:
determining a child node corresponding to the video label in the page node tree; and
replacing a first function with a second function in the child node corresponding to the video label, the first function being an original video playing function in the web page, and the second function being a function corresponding to the video player identified in the playing callback event; and
playing the video in the web page by using the video player identified in the playing callback event.

12. The storage medium according to claim 11, wherein the registering a playing callback event in the mutation observer process comprises:
registering a callback processing function in the mutation observer process, the callback processing function being a function of triggering the playing callback event;
obtaining a configuration parameter of the observation option in the playing callback event; and
setting, according to the configuration parameter of the observation option, a condition of triggering the callback processing function.

13. The storage medium according to claim 12, wherein the configuration parameter of the observation option comprises:
a monitored element attribute, a monitored child node list, and a child node level of a monitored object.

14. The storage medium according to claim 11, wherein the monitoring the page node tree, and performing the playing callback event when there is a video label in the page node tree comprises:
determining whether the video label exists in the page node tree when initialization of the page node tree is completed; and
performing the playing callback event if the video label exists in the page node tree; or
continuing to monitor the initialized page node tree if no video label exists in the page node tree; and if the page node tree changes, determining again whether the video label exists in the page node tree.

15. The storage medium according to claim 11, wherein the video player is not a built-in player of a browser loading the web page.

* * * * *